United States Patent [19]

Child et al.

[11] 4,401,607

[45] Aug. 30, 1983

[54] AERATED DRINKS MACHINE

[75] Inventors: Robert P. Child, Cosham; Barry G. Charles, Rowlands Castle, both of England

[73] Assignee: Thorn Cascade Company Limited, London, England

[21] Appl. No.: 248,707

[22] Filed: Mar. 30, 1981

[30] Foreign Application Priority Data

Apr. 2, 1980 [GB] United Kingdom ................ 8011043

[51] Int. Cl.³ .............................................. B01F 3/04
[52] U.S. Cl. ................................. 261/121 R; 99/285;
99/323.2; 261/DIG. 7
[58] Field of Search .................... 99/323.1, 285, 323.2, 99/275; 261/DIG. 7, 121 R

[56] References Cited

U.S. PATENT DOCUMENTS

| | | | |
|---|---|---|---|
| 2,916,599 | 12/1959 | Stiles | 99/285 |
| 3,862,646 | 1/1975 | Tarsha . | |
| 3,953,550 | 4/1976 | Gilbey | 261/DIG. 7 |
| 4,082,123 | 4/1978 | Haythornthwaite . | |
| 4,251,473 | 2/1981 | Gilbey | 261/DIG. 7 |
| 4,298,551 | 11/1981 | Adolfsson | 99/323.1 |

FOREIGN PATENT DOCUMENTS

| | | |
|---|---|---|
| 2451717 | 3/1980 | France . |
| 399352 | 10/1933 | United Kingdom . |
| 2026882 | 2/1980 | United Kingdom . |
| 2046112 | 11/1980 | United Kingdom . |
| 1582250 | 1/1981 | United Kingdom . |

*Primary Examiner*—Robert W. Jenkins
*Attorney, Agent, or Firm*—Fleit, Jacobson & Cohn

[57] ABSTRACT

An appliance for making an aerated beverage including a casing (10) a connection (13,14) carried by the casing for mounting a container (12) of pressurized liquid carbon dioxide, a transparent shatterproof housing (52) for a bottle of water carried by said casing, a nozzle (18) communicating with the connection and extending from the support member downwardly within the housing, a stopper for engaging in the neck of a bottle and a table base (64) for supporting the bottle (80) in the housing so that the stopper is engaged in its neck.

A manually operable valve (32) allows carbon dioxide to flow from the container (12) to the nozzle and a safety pressure valve (42) is connected to the interior of the bottle when the stopper is engaged in its neck. A bulb (82) illuminates the bottle at least while the water therein is being aerated, the illumination being picked up by the bubbles of carbon dioxide and giving a pleasing visual effect.

8 Claims, 3 Drawing Figures

AERATED DRINKS MACHINE

DESCRIPTION

The present invention relates to an appliance for making an aerated beverage.

Conventionally, appliances of this type can consist of a casing, in which is enclosed or mounted, a container of pressurized liquid carbon dioxide. Connected to this container, by a manually operated valve, is an elongate nozzle which is either permanently angled downwardly and forwardly, or is pivotable between such a position and a vertical position. A bottle, which is partly filled with water, is moved upwardly relative to the nozzle, so that the nozzle is immersed in the water, with the nozzle in the inclined position. The bottle is held in position with its neck against a stopper at the top of the nozzle, usually after pivoting the nozzle to a vertical position. The equipment also usually includes a shatterproof housing which surrounds the bottle, when it is in position around the nozzle.

The manually operated valve is actuated a few times and a carbon dioxide gas is thus introduced into the water. A safety valve is provided which releases any excess pressure which may occur in the bottle. The bottle is then removed from the appliance, and its contents are either used in this form, as soda water, or a concentrate flavouring syrup is added to obtain an aerated beverage, such as lemonade, tonic water, cola etc.

Where a shatterproof housing is provided, it has been conventional, in the past, for the shatterproof housing to be made of a metal tube, and for this in turn to be surrounded by a plastics moulding, which is used to improve the overall appearance.

Recently, it has been proposed to provide a transparent shatterproof housing which is preferably formed of polycarbonate of a sufficiently strong construction to withstand any bursting of the bottle, should the bottle be faulty. It has also been proposed to provide the shatterproof housing with two layers of transparent plastics material.

The advantage of having a transparent plastics material is that the operator can see the bubbles entering the water and this can give a pleasing effect.

It is now proposed, according to the present invention, to provide an appliance for making an aerated beverage, said appliance comprising a casing, a connection carried by said casing for mounting a container of pressurized liquid carbon dioxide, a transparent shatterproof housing for a bottle of water carried by said casing, a nozzle communicating with said connection and extending from said support member downwardly within said housing, a stopper for engaging in the neck of a bottle, means for supporting the bottle in said housing so that the stopper is engaged therein, a manually operable valve allowing carbon dioxide to flow from a container mounted on said connection to said nozzle, a safety pressure valve connected to the interior of the bottle when the stopper is engaged in its neck and means to illuminate the bottle at least while the water therein is being aerated.

With the appliance according to the invention, a very pleasing and rather surprising effect is achieved. When the light source is illuminated, particularly when it is located below the bottle, no particularly startling effect results. However, surprisingly, when the aerating nozzle is operated, the bubbles which swirl through the water catch the light and give a very pleasing visual effect.

This means to illuminate the bottle can take a number of different forms. Firstly, and preferably, the base upon which the bottle stands, while it is being aerated, can be provided with an incandescent bulb, which may, for example, be battery powered. Suitable means may be provided to cause the incandescent bulb to illuminate at an appropriate time.

In one known form of apparatus of this general type, the bottle is forced against the stopper, within the shatterproof housing, by a table which is lifted by the action of a cam. It is contemplated that in this type of apparatus the incandescent bulb can be provided in the table, so as to be immediately below the bottle when mounted thereon, and that the cam or an associated cam, which is used to raise the table, can turn a switch on.

Alternatively, it is possible for the bulb to be illuminated when the manually operable valve is actuated. Thus, for example, where a lever is provided to actuate the manually operable valve, this lever could have associated therewith the switch. Such a construction is particularly suitable in an appliance such as is described in British Patent Specification No. 2026882A being used, since this appliance, as such, does not require the bottle to be lifted and does not have a liftable table.

It is also contemplated that, according to the present invention, means may be provided to indicate either audibly, or visually, when the aerating process has been completed.

Thus, for example, when the above described illuminated bubble effect is provided, means may be included to change the lighting effect responsive to a pressure within the bottle being achieved. Thus, a pressure-sensitive switch may be provided, between the bottle and any safety valve, which can cause a change in the lighting effect. For example, this pressure-sensitive switch could change the colour of the lighting or it could simply turn the light off. Alternatively, or additionally, the pressure-sensitive switch may be responsive to cause some audible effect.

In order that the invention may more readily be understood, the following description is given, merely by way of example, reference being made to the accompanying drawings in which.

Figure 1:
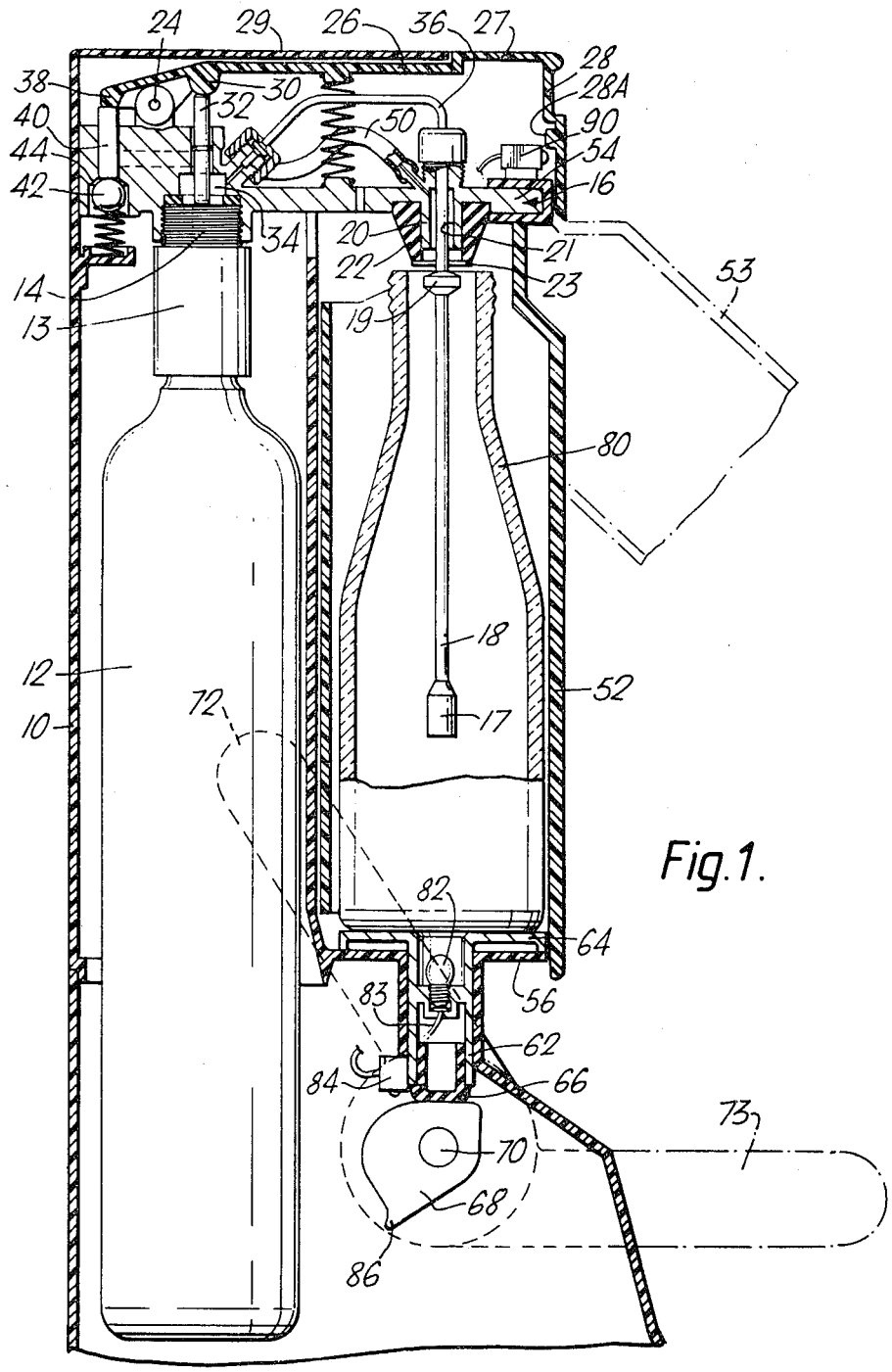
FIG. 1 is a side elevation, in section, of one embodiment of appliance according to the invention.

Referring first to FIG. 1, the appliance illustrated therein comprises a main casing 10 in which is positioned a carbon dioxide container 12, this being threaded with a fitting 14 forming part of an upper casing member 16. Secured to a portion 54 adjacent the front (i.e. the right as seen in the Figure) of member 16 is a downwardly depending hollow nozzle 18, the other part of which passes with clearance, through a bore 21 in an annular boss 20 integrally formed with a portion 54 of the member 16 and surrounded by a resilient stopper 22. The nozzle has a lower discharge head 17 for projecting gas into the water and an upper bead 19 spaced below a thin flexible annular membrane 23 which is secured to the lower face of the stopper and rests lightly against the stem of the nozzle 18, partly to close off the bore.

A pivot 24 carried by the member 16 is used to pivotally mount a manually operable actuating lever 26, having a portion 27 extending to the right of the top cover 29, and having a downwardly extending skirt portion 28 provided with an inwardly projecting cam surface 28A. The lever has a first projection 30 on the forward side of the pivot 24, this engaging a vertically reciprocable rod 32 which, in turn, engages a release pin (not shown) in the top of fitting 13 of container 12.

Actuation of lever 26 presses rod 32 down, which releases carbon dioxide into a chamber 34 in member 16, this gas being fed along a tube 36 to the interior of the nozzle 18.

Rearwardly of pivot 24 is a second projection 38 which engages a vertically reciprocable rod 40, which bears on a sprungloaded ball valve 42, normally to hold it away from the valve seat 44. The annular space 21 is connected to a point above the valve seat 44 by a flexible tube 50.

A shatterproof, transparent polycarbonate housing 52 is connected to member 16 and surrounds the nozzle 18. This polycarbonate housing is preferably formed of an inner shatterproof portion facing the user and an outer part which is shaped to conform to the outline of the appliance. The two layers of polycarbonate give increased strength against the possibility of a bottle shattering. The portion 54 of the member 16 is connected to the remainder of the member 16 by a hinge (not shown), enabling housing 52, nozzle 18 and the associated part 20,22,36 to pivot forwardly to the position indicated in phantom at 53.

Mounted below the open bottom of the housing 54, when in its full line, upright position, is a horizontal casing portion 56. Vertically reciprocable through this portion 56 is a stem 62, having a flat table 64 at its top and a plug 66 at its bottom. The plug forms a follower for a cam 68 mounted on a shaft 70 which carries a lifting lever 72, which can be pivoted about the axis of a shaft 70 to the position indicated in phantom at 73. When this is done, the cam 68 will lift the follower 66, and thus the stem 62 and the table 64 upwardly, to press the neck of a bottle 80 firmly against stopper 22 to form a seal.

Mounted within the stem 62 and below the table 64 is an electric light bulb 82 which is connected via a lead 83 to a microswitch 84 which can be actuated by a portion 86 of the cam 68, (or by a microswitch (not shown) operated by the stem 62), the position indicated at 73, that is when the bottle is in engagement with the stopper. Thus, the light will be illuminated, with this arrangement, when the bottle is in the up position.

Additionally, or alternatively, a further microswitch 90 can be provided behind the skirt portion 28 of the lever 27 so as to be closed when the lever 27 is pushed downwardly, by the interaction between the microswitch and the projection 28A.

In use, the housing is pivoted out to the phantom position 53 and the partly filled bottle 80 is inserted, with the pivoted nozzle 18 inside the bottle. The housing, together with the nozzle and bottle is pivoted back and the lever 72 is pulled down to the position 73. This will lift the bottle and cause the light 82 to come on if only the microswitch 84 is provided.

When the lever 27 is depressed, rod 32 is moved down, releasing carbon dioxide into the chamber 34, and thence via tube 36 and nozzle 18 into the bottle. A very startling effect is produced when this happens. The bottle in fact only shows a minor change when the light 82 was turned on. However, when the bubbles of carbon dioxide are projected into the water in the bottle, these bubbles pick up the light and give a pleasing effect, which can be observed through the transparent housing.

As indicated, instead of having the microswitch 84, the microswitch 90 can be provided so that the light only comes on at the moments when one is actually projecting gas into the water.

Figure 2:
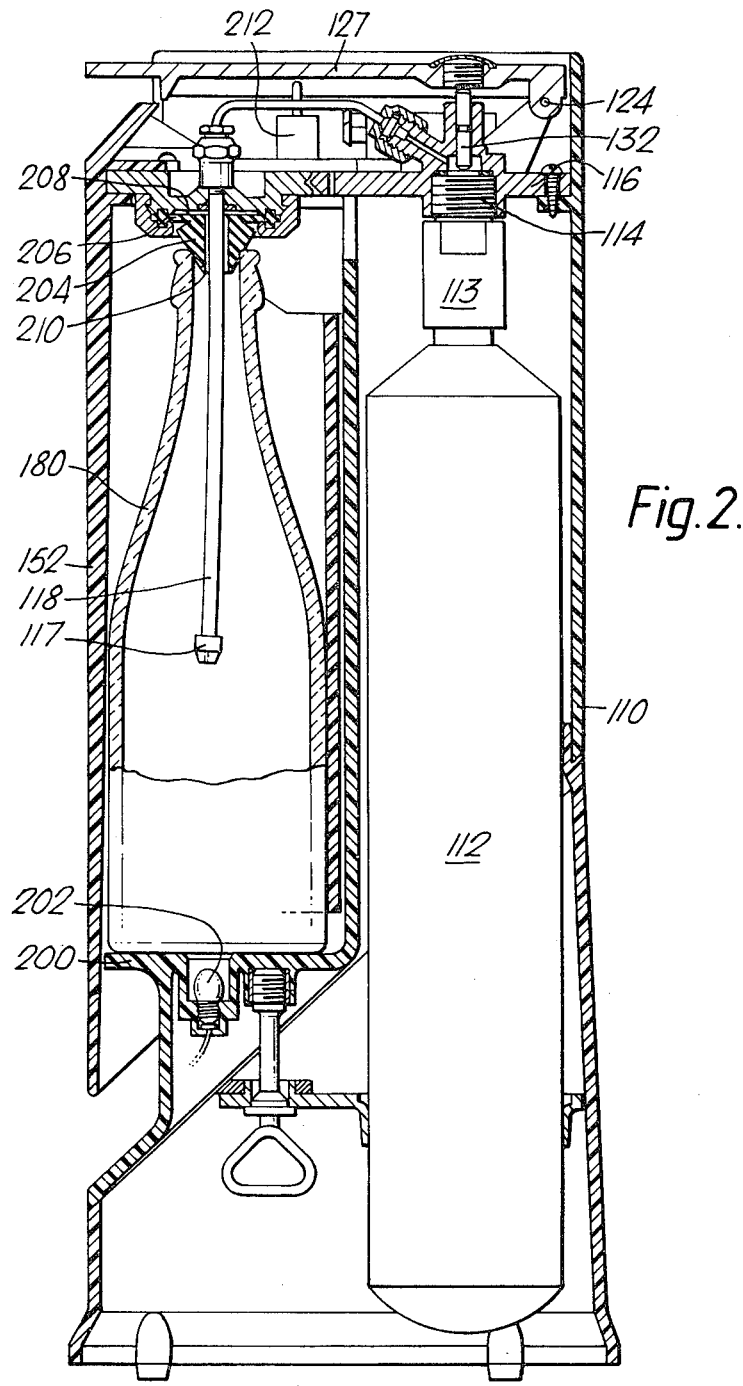
FIG. 2 is a similar view, but from the other side, of a second embodiment of an appliance according to the invention.

The construction of FIG. 2 has a number of features in common with that of FIG. 1, and like parts, in this respect, have been indicated by like reference numerals plus 100, thus, the casing 110 encloses a carbon dioxide container 112, having a fitting 113 screwed into a member 116 at 114, the gas being released by the operation of the lever 127, pivotable about point 124, and acting upon a rod 132.

In this construction, however, the bottle is not lifted up by a table. The shatterproof housing 152 is, as before, pivotable forwardly so that a bottle 180 can be introduced with the nozzle 118 inserted therein. When the housing 152 is closed to the position shown, the bottle rests on a surface 200 which accommodates a light bulb 202. The surface 200 supports the bottle against a stopper 204 carried by a flexible diaphragm 206 having a space 208 thereabove. The upwardly projected area of the diaphragm appearing in this space 208 significantly greater than the downwardly projected area of the stopper when the latter is engaged in the neck of the bottle 180. Thus, when the lever 127 is operated, carbon dioxide is introduced into water in the bottle 180, and, because of a clearance 210 between the nozzle 118 and the stopper 204, this clearance communicating with the space 208, the pressure acting on the top surface of the diaphragm produces a greater downward force than the upward force of the pressure within the bottle, thus sealing the stopper in the bottle.

The appliance is also provided with a microswitch 212 which is actuated by depression of the lever 127. Thus, as before, when the lever 127 is depressed, to project carbon dioxide into water in the bottle 180, the light 202 is illuminated, and this illumination is picked up by the bubbles.

Figure 3:
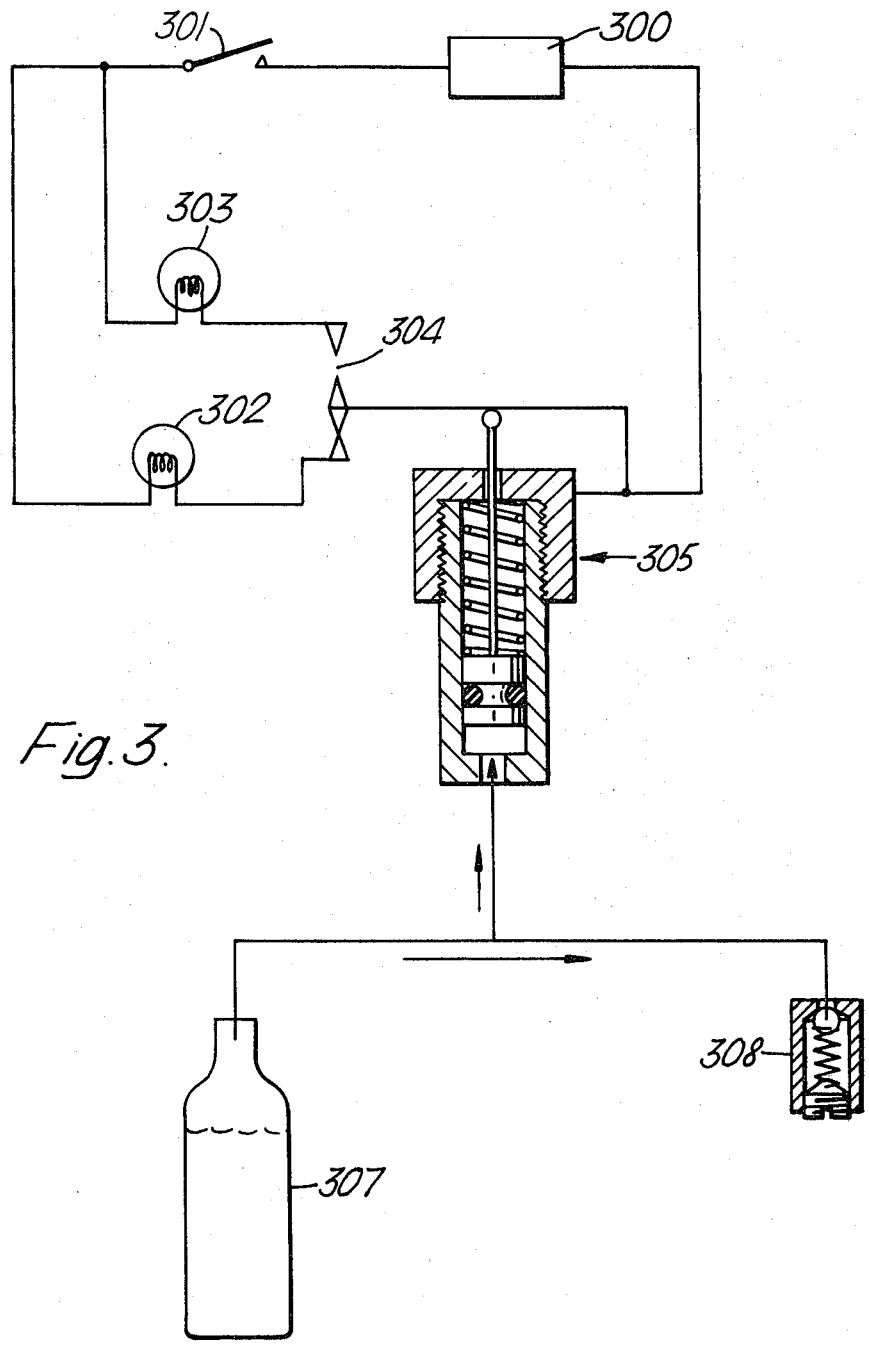
FIG. 3 is a schematic circuit diagram showing a possible wiring of the appliance of FIG. 1 or FIG. 2.

FIG. 3 illustrates a circuit diagram showing how one illuminating effect can be produced while aeration is taking place and how to change the lighting effect responsive to a particular pressure within the bottle being achieved. Thus, the device discloses a battery 300, connected via a manually operable switch 301 (which may be the microswitch 84 of FIG. 1 or the microswitch 212 of FIG. 2). Two bulbs 302 and 303, one being one colour and one being of the other are connected in parallel and can alternatively be connected as a result of the action of a switch 304. The position of the switch 304 is controlled by a pressure-sensitive device 305 so that the devices 304 and 305 together form a pressure sensitive switch. The pressure of the water in the bottle 307 and in the exhaust valve 308 is sensed by the pressure-sensitive device 305. It will be seen that in use, when the switch 301 is closed, current flows first via the bulb 303 until the pressure-sensitive switch detects a desired pressure in the bottle and disconnects bulb 303 and connects bulb 304.

We claim:

1. An appliance for making an aerated beverage, said appliance comprising a casing, a connection carried by said casing for mounting a container of pressurized liquid carbon dioxide, a transparent shatterproof housing for a bottle of water carried by said casing, and pivotally mounted so that it can be pivoted from a first position in which a bottle can be introduced into or removed from said shatterproof housing and a second position, a nozzle communicating with said connection and extending downwardly within said housing, a stopper engaging in the neck of a bottle, a table for temporarily supporting the bottle within said housing when the latter is in its second position, so that the stopper is engaged therein, a manually operable valve allowing carbon dioxide to flow from a container mounted on said connection to said nozzle, so that it is injected into water in a bottle temporarily supported by the table, a safety pressure valve connected to the interior of a bottle when the stopper is engaged in its neck and an incandescant bulb provided in the table for temporarily supporting the bottle within said housing, whereby the bulb is within the housing and adjacent the bottle, effective to illuminate the bottle at least while the water therein is being aerated.

2. An appliance as claimed in claim 1, and further comprising a cam to lift the table to force the bottle against the stopper and wherein the bulb is provided in the table so as to be immediately below the bottle when mounted thereon.

3. An appliance as claimed in claim 2, and further comprising a switch which is provided to cause illumination of the bulb when the cam is operated to raise the bottle.

4. An appliance as claimed in claim 1, and further comprising a switch which is provided to illuminate the bulb when the manually operable valve is actuated.

5. An appliance as claimed in claim 4, and further comprising a lever positioned to actuate said manually operable valve, said lever being operatively associated with said switch.

6. An appliance as claimed in claim 1, wherein the shatterproof housing is formed, at least at the front, with spaced walls of transparent plastics material.

7. An appliance as claimed in claim 1, and further comprising a pressure-sensitive switch between the bottle and the safety valve and means to cause a change of the illuminating effect when a predetermined pressure is reached.

8. An appliance as claimed in claim 7, wherein two bulbs of different colour are provided, one being illuminated during aeration and the other being illuminated when the predetermined pressure is reached.

* * * * *